United States Patent
Baechtle

(10) Patent No.: US 9,044,031 B2
(45) Date of Patent: Jun. 2, 2015

(54) METHOD AND DEVICE FOR PORTIONING A SAUSAGE STRING GENERATED BY A FILLING MACHINE

(71) Applicant: ALBERT HANDTMANN MASCHINENFABRIK GMBH & CO. KG, Biberach (DE)

(72) Inventor: Manfred Baechtle, Schemmerhofen (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 0 days.

(21) Appl. No.: 14/099,611

(22) Filed: Dec. 6, 2013

(65) Prior Publication Data

US 2014/0170946 A1 Jun. 19, 2014

(30) Foreign Application Priority Data

Dec. 17, 2012 (EP) .................................... 12197462

(51) Int. Cl.
*A22C 11/00* (2006.01)
*A22C 11/10* (2006.01)

(52) U.S. Cl.
CPC ............... *A22C 11/10* (2013.01); *A22C 11/104* (2013.01); *A22C 11/006* (2013.01)

(58) Field of Classification Search
USPC ............ 452/21–26, 30–35, 37–39, 46–48, 51
See application file for complete search history.

(56) References Cited

U.S. PATENT DOCUMENTS

| 4,112,546 | A | | 9/1978 | Muller | |
| 5,405,288 | A | * | 4/1995 | Stanley | 452/48 |
| 6,123,613 | A | * | 9/2000 | Righele | 452/31 |
| 7,381,123 | B2 | * | 6/2008 | Bachtle | 452/46 |
| 7,479,058 | B2 | * | 1/2009 | Baechtle et al. | 452/51 |
| 7,862,407 | B2 | * | 1/2011 | Panizzon | 452/29 |
| 7,972,202 | B2 | * | 7/2011 | Le Pabic | 452/49 |
| 8,641,484 | B1 | * | 2/2014 | Weers et al. | 452/46 |

FOREIGN PATENT DOCUMENTS

| EP | 2213177 A1 | 8/2010 |
| EP | 2316272 A1 | 5/2011 |
| EP | 2489274 A1 | 8/2012 |

OTHER PUBLICATIONS

European Search Report for Appl. No. 12197462.0, dated May 3, 2013.

* cited by examiner

*Primary Examiner* — Richard Price, Jr.
(74) *Attorney, Agent, or Firm* — Marshall, Gerstein & Borun LLP

(57) ABSTRACT

A method and a device for portioning a sausage string generated by a filling machine into individual sausage portions, having the following steps: transportation of the sausage string in the direction of transport, portioning the filled sausage string by means of opposing portioning elements, which engage in the sausage string, wherein the movement of the portioning elements is controlled, in each case, along a freely adjustable track.

15 Claims, 9 Drawing Sheets

METHOD AND DEVICE FOR PORTIONING A SAUSAGE STRING GENERATED BY A FILLING MACHINE

CROSS-REFERENCE TO RELATED APPLICATION

The present application claims the benefit of priority of European Application No. 12197462.0, filed Dec. 17, 2012. The entirety of the priority application is incorporated herein by reference.

FIELD OF THE DISCLOSURE

The disclosure relates to a method and a device for portioning a sausage string generated by a filling machine.

BACKGROUND

A device is already known from EP 0 392 083, in which two opposing displacement elements turn synchronously on fixed axles. Products having different lengths can be produced by means of the variable circumferential speeds of the displacement elements. After the constriction of the filler strand, the displacement elements open up again immediately. The constricted radius and the unconstructed radius are fixed values. It has been determined that, particularly in the production of sausages in natural intestine casings, the casing may rupture during the portioning.

A device is described in EP 1 902 622 with which different product lengths can be produced by means of a variable portioning chain. With this device as well, problems may arise with delicate natural intestine casings. When changing the caliber or the length of the sausage, mechanical modifications are necessary.

A device is described in EP 1 434 490 with which each point of a displacement element moves as the same speed during the portioning. The displacement devices move on a fixed track. In this case as well, the displacement elements open up immediately after constriction of the filler strand, and mechanical modifications are also necessary when changing the caliber or the length of the sausage. Furthermore, problems also arise when using natural intestine casings.

The known portioning devices and methods so far do not enable an optimal portioning procedure for different sausage products. For this reason, sausage rupturing, or misshapen portions can always occur. When changing to a different sausage caliber, or a different sausage length, respectively, the facility must be mechanically retooled, which is both time consuming, and cost-intensive.

Based on this, the present invention addresses the objective of providing a method and a device for the gentle portioning of a sausage string generated in a filling machine, with which the portioning procedure can be adapted to different sausage products in a flexible manner, without retooling.

SUMMARY OF THE DISCLOSURE

According to the present invention, it is thus possible to control the movement of each of the portioning elements along a track that can be adjusted freely. This means that now, unlike in the prior art, in which the portioning elements are moved on a fixed track that has be adjusted in advance, instead, the movement track of the portioning elements can be adjusted according to specific parameters for specific sausage products.

A freely adjustable track in this case means that a movement mechanism, or a corresponding drive for the movement mechanism, respectively, can be activated by a control unit such that a desired track is obtained, without the need for a mechanical retooling. In this manner, according to the present invention, an extensive retooling of the portioning device for different sausage calibers or different sausage types is eliminated. The entire track can be adjusted in accordance with the product and the casing. By way of example, delicate casings can be treated differently than those that are less delicate. As a result, fewer casing ruptures occur. The path of travel in a direction at a right angle to the direction of transport is different with small calibers than with large calibers. On the whole, a high portioning capacity is obtained because it is possible to operate the device in a manner optimized with respect to caliber and length.

It is particularly advantageous if the track coordinates (X, Y coordinates of the two-dimensional track) as well as the speed of the respective portioning elements can be adjusted on different tracks as a function of at least one of the following parameters:

The length of the sausage portion, the caliber of the sausage portion, the transport speed of the sausage string transported in the direction of transport, as well as the type of casing for the sausage.

With a method of this type, it is possible to adjust the movement of the respective portioning elements to the length and caliber of the sausage portion. It is also possible, depending on the type of sausage casing, to obtain a slow and gentle constricting, or a quick constricting, this being dependent on the transport speed for the sausage string that is being transported, or the speed components of the portioning element movement in the direction of transport. The depth, i.e. the extent to which the portioning element is moved toward the central axis of the sausage string, can also be adjusted. Different residual cross-sections, i.e. immersion depths, can thus be adjusted by means of the flexible movement at a right angle to the sausage.

It is advantageous that a movement of the respective portioning element in a direction perpendicular to the direction of transport is controlled independently of a movement in a direction in the direction of transport, and in particular, that the speed of the respective portioning elements in a direction perpendicular to the direction of transport T can be controlled independently of the speed of the portioning elements in the direction of transport.

As a consequence, the portioning elements can be placed in specific positions in a targeted manner. Speed, in the direction of transport or perpendicular to the direction of transport, respectively is understood thereby to also mean speed components if the movements in the direction of transport, or perpendicular to the direction of transport are superimposed.

It is particularly advantageous if the respective portioning elements, when they come in contact with the sausage string, or engage in the sausage string, can be moved on their track a predetermined distance s on a track section that runs parallel to the central axis M of the sausage string, and the predetermined distance lies, in particular, in a range of 0-100 mm.

In differing from the prior art, the present invention thus enables the portioning elements to move parallel to the sausage string, together with the sausage string, wherein the length of this distance can be freely adjusted. In the prior art, there were only movements wherein movement components in the direction of transport and perpendicular to the direction of transport were superimposed. A collective conveyance of this type has the advantage that, in particular, delicate sausage casings, such as natural intestines, can be guided further. It is also possible for the portioning elements to be retracted from the sausage string after the displacement far enough that they can then merely assume guidance tasks. These guidance tasks can be designed such that, e.g. with longer portion, the displacement elements can be closed, prior to the portioning, only as far as the sausage caliber, or slightly larger, i.e. the outer surface of the filled sausage string, and thus the sausage portion is only guided centrally in the course of the travel. According to the present invention, the portioning elements can thus assume additional functions, in particular a guidance function.

Because the portioning elements can move such that they move different distances into the sausage string with different calibers, only one size for the displacement elements is necessary for all calibers. This means that there is no need for retooling for different calibers.

According to the present invention, it is also advantageous that the immersion of the portioning element can be adjusted, this being from the sausage guidance to overlapping immersions of the portioning element, i.e. far enough to separate the portions. This means that both for constricting, i.e. when the sausage portions are still connected to one another, as well as for the complete separation, the same portioning elements can be used for different calibers.

It is particularly advantageous if the speed of the respective portioning element in a direction perpendicular to the direction of transport for the sausage string, when the respective portioning element moves from the outer contour of the sausage string into the sausage string, differs from the speed counter to this direction, perpendicular to the direction of transport for the sausage string when the respective portioning element is retracted from the sausage string. With this, it is thus possible, for example, that the portioning elements move very slowly in the direction of transport during the constricting, while being able to be retracted from the sausage string very quickly. This enables the advantage that the portioning is gentle, and the portioning elements can move together with the sausage portions over a long distance, such that the sausage can be guided for a long time through the portioning elements, and thus the distance in which the sausage is not guided to the next transport means (for example, up until the next conveyor belts) can be kept as small as possible.

With the method according to the invention, the portioning elements run through at least the following steps on their track:

a) Constricting step, in which the portioning elements are moved from a starting point toward one another, b) Conveyance step, in which the portioning elements are each moved collectively in the direction of transport, c) Decoupling step, in which the portioning elements are each retracted from the sausage string, and d) Return step, in which the portioning elements are returned to their starting positions.

According to the present invention, the length of the conveyance step can be freely adjusted. With the method according to the invention, the steps a), b) or b) and c), respectively, can be superimposed, i.e. while the portioning element moves in a direction perpendicular to the direction of transport, it is simultaneously conveyed in the direction of transport, and while it is being disconnected, it likewise is moved in the direction of transport as well. It is also possible for steps c) and d) to be superimposed if the sausage or the sausage tip is not touched thereby. A method of this type, in which the length and speed of the step b) can be freely adjusted, enables a particularly gentle portioning.

The device according to the invention includes two portioning elements, which lie on opposite sides of the sausage string transported in the direction of transport. The track on which the portioning elements are moved can be freely adjusted. The device comprises two drives for each element thereby, which can be activated independently of one another, i.e. for each side. Moreover, a movement mechanism is provided, which is connected to the two drives and the respective portioning element, wherein the movement mechanism is designed such that the respective portioning elements can move along the freely adjustable track.

According to a preferred embodiment, the respective movement mechanism comprises two drive links, each of which are connected to one of the two drives, as well as two coupling links, which are connected in an articulated manner to the drive links, wherein the coupling links are also connected in an articulated manner to one another, and the respective portioning element is disposed on at least one coupling link. A mechanism of this type enables any arbitrary movement over the movement direction of the drive as well as the angle of rotation for the drive, i.e. in the direction of transport, perpendicular to the direction of transport, and also superimposed movements.

It is particularly advantageous if the movement mechanism comprises a parallelogram guide, such that the respective portioning element maintains a consistent orientation to the sausage string when moving on the track. In particular, the portioning element attached to the coupling link should maintain a consistent orientation to the sausage string during the movement along a track for the coupling link. In this manner, it can be ensured that the portioning elements, while they are in contact with the sausage string, always remain in the correct orientation.

According to the present invention, the drives (i.e. the drive shafts, which are oriented perpendicular to a plane containing the track during the movement of the portioning elements on their track) move back and forth. This means that the drives execute an "oscillating" back and forth movement and are activated at all times in relation to the course of the track. This means that, in differing from prior drives, the drives do not execute a continuous rotation in one direction, but instead, rotate back and forth in an angular range of <360°, preferably in a range of <200°.

The device comprises a control, which converts the track coordinates (X, Y) into angular positions of the drive. This is possible using an appropriate program, when the dimensions of the movement mechanism are known.

The portioning elements lying opposite one another each have two drives, wherein at least one drive of a portioning element is coupled to a respective drive of the other portioning element. This is accompanied with the advantage that a total of not four, but only two servomotors are necessary, because the opposing portioning elements, with respect to the sausage string, have identical movement sequences. The corresponding other drive of one of the portioning elements can then, in turn, be coupled to the second drive of the portioning element lying opposite.

Advantageously, a filling machine comprises the device according to the invention, and has an input means, in which the lengths and calibers of the sausage portions can be entered, as well as, advantageously, the type of sausage casing, such as natural intestine or synthetic intestine, or instead, e.g. a delicate or robust casing. The movement of the portioning element can then be controlled in an appropriate manner by the control unit. The corresponding track speeds, or section speeds, respectively, are stored in advance in the control unit thereby, wherein individual parameters can still be changed.

It is also possible for the portioning elements to be driven independently of one another. This embodiment is particularly suitable if the portioning elements are moved toward one another to the extent that a so-called sausage pigtail remains, and the displacement elements are designed such that the sausage pigtail is retained in the opening, and does not slip out. In this case, one displacement element can run faster than the other in the conveyance step, specifically the upstream displacement element in the direction of transport T. In this manner, this device can also be used for an application in conjunction with a clipping machine, which places a clip on the sausage pigtail between the displacement elements.

BRIEF DESCRIPTION OF THE SEVERAL VIEWS OF THE DRAWINGS

The invention shall now be explained in greater detail with reference to the following figures.

DETAILED DESCRIPTION OF THE PREFERRED EMBODIMENTS

Figure 1:
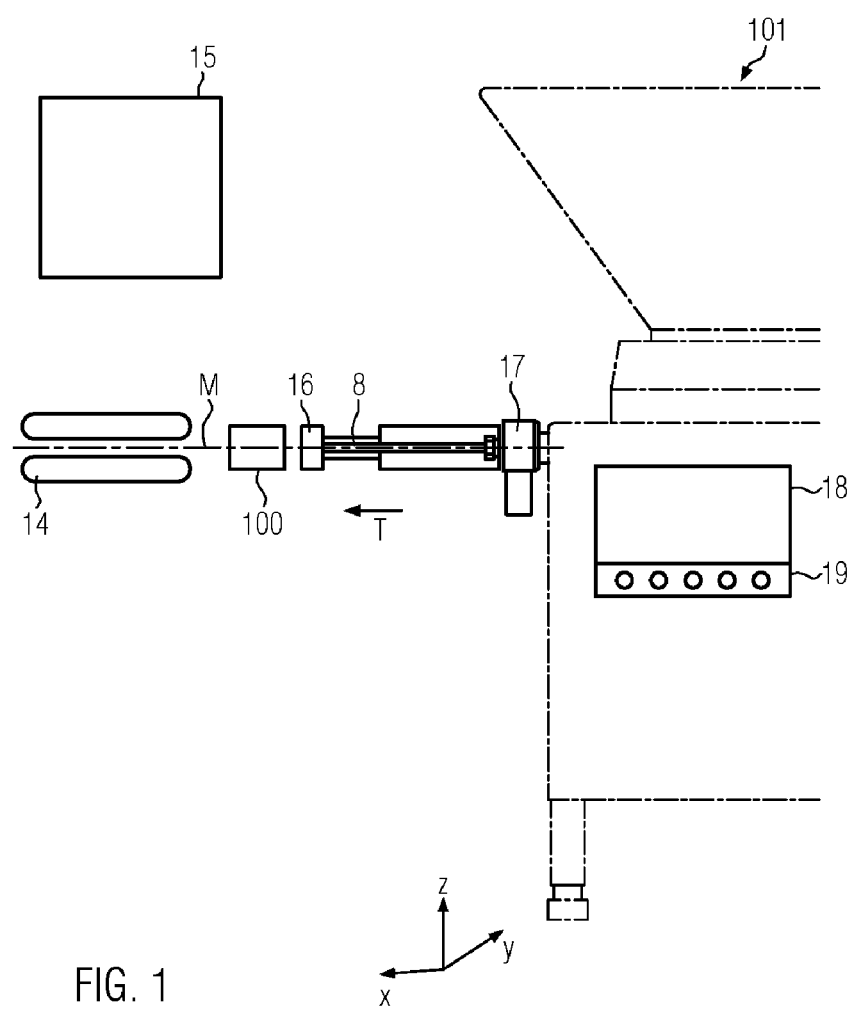
FIG. 1 shows, roughly schematically, a filling machine according to the present invention.

FIG. 1 shows, roughly schematically, a filling machine 101 for generating sausage portions. In doing so, the filler is fed through a funnel in the known manner, and transported into the filling tube 8 by means of a conveyor, which is not shown. A casing brake 16 is located at the filling tube end 8. In order to twist off the filled sausage string, a twist-off unit 17, i.e. a twist-off drive, is provided optionally, which is driven by means of a motor. By means of the twist-off drive, the filling tube 8 can be rotated, together with the sleeve pulled over it, about the central axis M of the sausage string. By means of the filling tube 8, the paste-like mass is pushed into the sleeve, e.g. casing, that is pulled onto the filling tube 8 and held in place by means of the casing brake 16, by means of which the filled sausage string 7 is generated in the known manner. As an alternative to the casing brake, a co-extrusion device can also be provided for producing a filled sausage string.

The device 100 for portioning the filled sausage string into single portions of a predetermined length L is located directly behind the filling tube. This device shall be described in greater detail below, in particular in conjunction with FIGS. 2-9.

Following the device 100, another transport device 14, for example in the form of conveyor belts lying opposite one another, can be provided, which receives the sausage portions and conveys them further in the direction of transport T. The device 100 can be activated by means of a control unit 15. The control device 15 can also be integrated thereby in the filling machine 101, in particular in the control unit for the filling machine 101. The device 100, or the filling machine 101, has a display unit 18, in which, among other things, certain adjustable parameters, such as, e.g. the production capacity, track course, etc. are displayed. Furthermore, an input device 19 is provided, by means of which certain functions or parameters can be entered. In particular, the length and the caliber of the sausage portion that is to be generated can be entered. Furthermore, a sausage casing type can be entered, for example, with regard to whether the casing type is a very delicate sausage casing (e.g. natural intestine, co-extruded casing) or a robust sausage casing (e.g. synthetic intestine). The control unit 15 can then activate the device 100 in accordance with these parameters.

Figure 2:
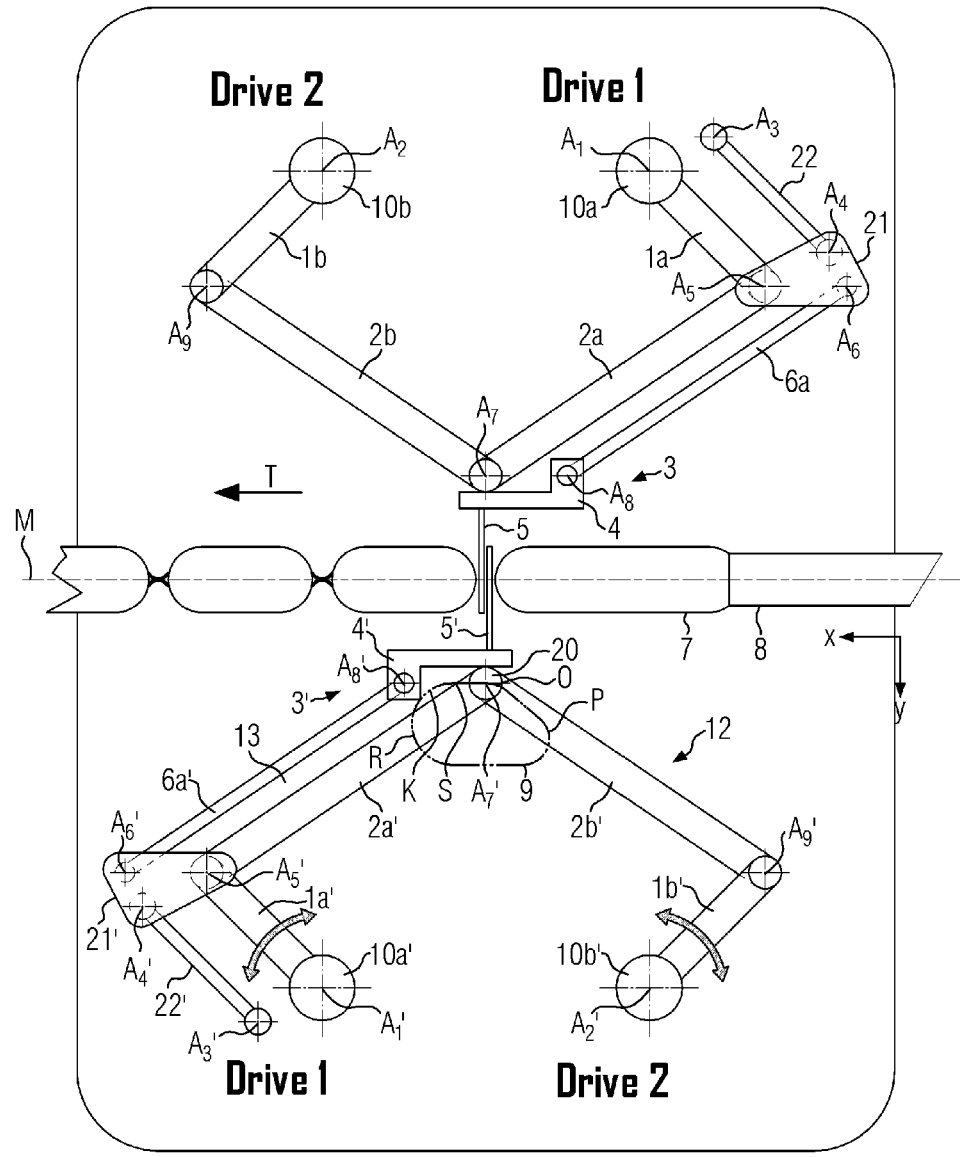
FIG. 2 shows, schematically, a top view of a device for portioning according to the present invention, having a short conveyance path for short and long portions, in a first position.

FIG. 2 shows a top view of a device 100 according to an embodiment example of the present invention. The device 100 for portioning the sausage string 7 is disposed in the direction of transport behind the filling tube 8 such that the portioning elements 3, 3', lying opposite one another in relation to the sausage string 7, can engage in the sausage string 7, in order to either constrict this sausage string, i.e. generate sausage portions, which are still connected to one another, or, however, to completely sever the sausage string at specific locations, such that individual sausages are created.

The portioning elements 3, 3' can be guided in the device 100 along the freely adjustable track shown in FIG. 2. The movement of the portioning elements 3, 3' is thus not limited to a single mechanically predetermined track. For purposes of simplicity, the track 9 is only depicted on one side of the device 100, wherein the portioning element 3 passes through a corresponding track 9, reflected over the central axis M. Two drives 10a', 10b', 10a, 10b are provided on each side of the device with respect to the sausage string 7.

The manner of function for the drives and the movement mechanism shall be explained, for purposes of simplicity, with reference to the lower part of the device 100 shown in the figures, but also applies accordingly for the upper part. Drive 1 and drive 2 are driven independently of one another, by means of motors, in particular servomotors, which are not shown. The motors are activated thereby, independently of one another, by means of a control unit 15. The drives 10a', 10b' comprise drive shafts, running perpendicular to the image plane depicted in FIGS. 2-8 (along the Z-axis). The drives 10a', 10b' are activated such that they execute a back and forth movement during the portioning operation, as indicated by the arrow. The back and forth movement of the drives 10a', 10b', or the drive shafts, respectively, occurs within an angular range of <360°, preferably <200°. A movement mechanism 12 is connected to the respective drives. The movement mechanism 12 comprises two drive links 1a', 1b', which are each connected in a fixed manner to corresponding drive 10a', 10b'. When the drives 10a', 10b' therefore rotate about the respective axes A1', A2', the drive links 1a', 1b' are then moved accordingly. Corresponding coupling links 2a', 2b' are connected in an articulated manner to the respective drive links 1a', 1b', i.e. the coupling links 2a', 2b' can move about the respective axes A5' and A9' in the X-Y plane, wherein the X-Y plane is a plane which either contains the filled sausage string 7, or runs parallel to the central axis M. The two coupling links 2a', 2b', in turn, are connected in an articulated manner such that they can rotate about the axis A7'. The portioning element 3' comprises a displacement body support 4' as well as a displacement element 5'. The portioning element, in particular the displacement body support 4', is connected, according to the present invention, to one of the coupling links 2a', 2b'. In this manner, the portioning element 3' can be moved together with the movement of the coupling links.

It is particularly advantageous that the portioning element 3' is disposed such that its orientation in relation to the sausage string 7 always remains the same, i.e. here for example, such that the displacement element 5 is oriented at a constant angle (here 90°) to the central axis M. For this, the movement mechanism can preferably exhibit a parallelogram guide 13. The portioning element, preferably the displacement body support 4', has a section thereby, here e.g. a projection 20, in which it is rotatably supported about the axis A7', and is connected to the coupling links 2a', 2b' such that it can rotate about this axis. Lastly, the parallelogram guide exhibits the parallel crank 6a', which is disposed parallel to one of the coupling links 2a', and is likewise connected in an articulated manner, i.e. such that it can rotate about the axis A8', to the portioning element, in this case the displacement body support 4'. Both the parallel crank 6a' as well as the coupling link 2a' are likewise supported in the part 21', such that they can rotate about the axes A6' and A5'. A straight line, which runs through the axes A6' and A5', is parallel to an axis, which runs through the axes A8' and A7'. Furthermore, the parallel crank 22', which runs parallel to the drive link 1a', is rotatably supported on the axis A3'. For this, a straight line running through the axes A3' and A1' is parallel to a straight line running through the axes A4' and A5'. The parallel crank 22' is likewise rotatably, or in an articulated manner, respectively, attached in the part 21'. By this means, the portioning element 3' can maintain a consistent orientation to the sausage string 7 during the movement on the track 9. The portioning element 3' disposed on the coupling link 2a' thus moves together with the movement of the coupling links 2a', 2b' caused by the drives 10a', 10b', and maintains its orientation on this movement track.

In this embodiment example, the parallelogram guide 13 is disposed on the second drive and coupling link, seen in the direction of transport. It is, however, also possible that the first drive and coupling link shown in the direction of transport include the parallelogram guide.

The opposing portioning elements 3, 3' each have two drives 10a', 10b', wherein at least one drive on one side is coupled in each case with one drive on the other side. In the embodiment example shown in FIG. 2, the drive 10a' is coupled with the drive 10a, meaning that the drives are powered by a common servomotor. The drive 10b is coupled to the drive 10b', and are likewise powered by means of a common servomotor. It would also be possible for the drives to not be coupled to one another diagonally, but instead, those drives lying opposite one another are coupled, wherein, however, the movement mechanisms would then be disposed such that the drives 10a and 10a' and the drive 10b and 10b', would be directly opposite one another, and not diagonal, as shown in the figures.

By means of the targeted activation of the drives, the respective portioning element 3, 3' can be moved along a desired track 9, wherein the X-Y position of the portioning element 3, 3' is converted by a program in the control unit 15 to the angular position of the drives, or the associated servomotors, respectively. This means that the movement mechanism according to the invention enables the portioning elements 3, 3' to be moved not on a single prepared track, but rather, the movement of the respective portioning elements 3, 3' can be controlled in a direction perpendicular to the direction of transport T (i.e. in the Y axis), independently of a movement in a direction in the direction of transport (X axis), and in particular, the speed of the respective portioning elements 3, 3' in a direction perpendicular to the direction of transport T (Y axis) can be controlled independently of the speed of the portioning element 3 in the direction of transport T (X axis).

In doing so, the track coordinates x, y for the track, as well as the speeds of the respective portioning elements 3, 3' on different track segments can be adjusted in relation to different parameters, such as, for example, the lengths of the sausage portions, the caliber of the sausage portions, the transport speed of the transported sausage portions in the direction of transport, or the type of sausage casing.

In FIG. 2, the portioning elements 3, 3' are shown at a position O, where they engage with the sausage string 7. The extent to which the portioning element, or the displacement element 5 of the portioning element, respectively, is moved into the sausage string in a direction perpendicular to the direction of transport T depends on the sausage caliber (sausage diameter) as well as on the desired degree of constriction. The displacement elements 5 are preferably guided as closely as possible past one another. The displacement elements can also be inserted into the sausage string far enough that the sausage string is severed, in order to generate separate individual portions. If so, then a means, e.g. a downstream conveyor, e.g. belts 14 in FIG. 1, must retain the individual sausages. As can be derived from FIGS. 2 and 3, the portioning element is then guided onto a section s in a direction running parallel to the central axis M of the sausage string 7 by means of a corresponding activation of the drives 10a', b', 10a, b. This is accompanied by the advantage that the sausage string is then still guided and retained by the displacement elements 5 over this distance s. The distance s can lie in a range of <100 mm, preferably 5-100 mm. At a point K, the portioning elements 3, 3', or the displacement elements 5, 5', respectively, are again retracted from the sausage string 7, wherein at this point a movement in the direction of transport T is superimposed with a movement perpendicular to the direction of transport T. The portioning elements 3, 3' then move from point R back to the closed track, to a point P, as can be seen in FIG. 4. Starting from point P, the portioning elements 3, 3' again begin to move toward one another, wherein the track and the speeds are configured such that the displacement elements 5 then re-engage in the sausage string 7, precisely when the generated sausage portion has reached a certain length L.

Advantageously, the track 9 is designed such that it extends in the direction of transport T further than it extends perpendicular to the direction of transport. By this means it is ensured that the portioning element can move together with the sausage portion for supporting purposes. In this manner, the sausage portion can be guided, as can be seen in FIG. 1, as far as possible, until it is transferred to the next transport means 14.

Figure 3:
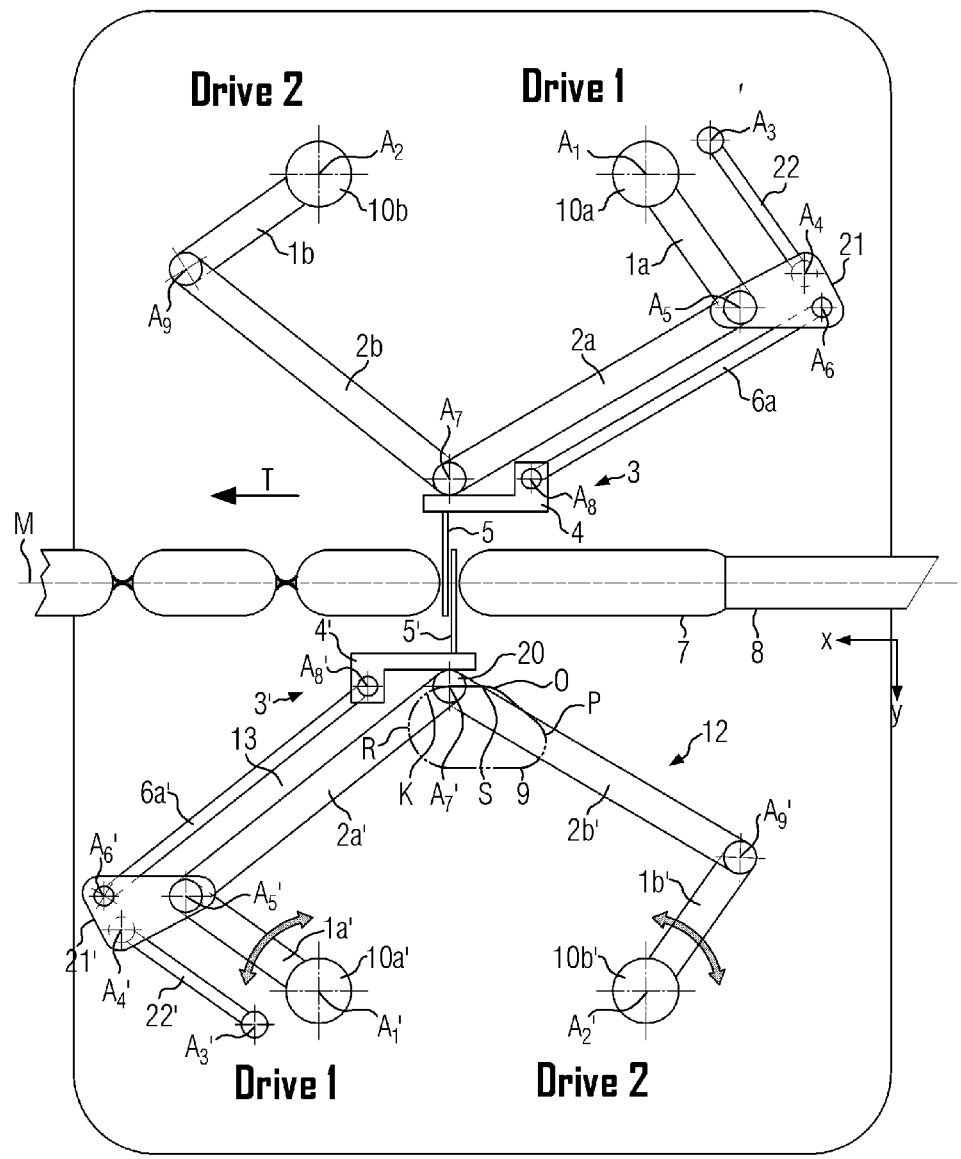
FIG. 3 shows the device shown in FIG. 2, in a second position.
Figure 4:
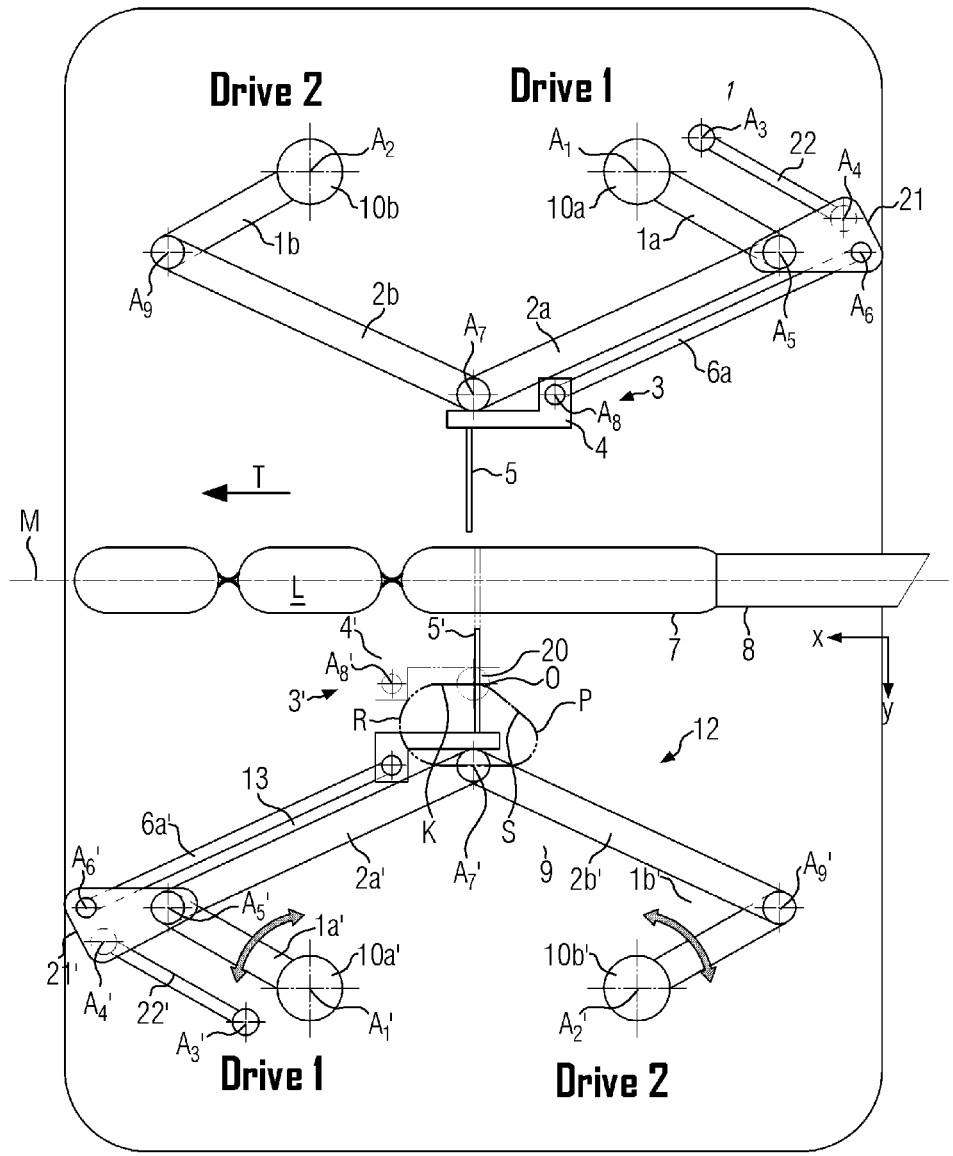
FIG. 4 shows the device shown in FIGS. 2 and 3, in a third position.
Figure 5:
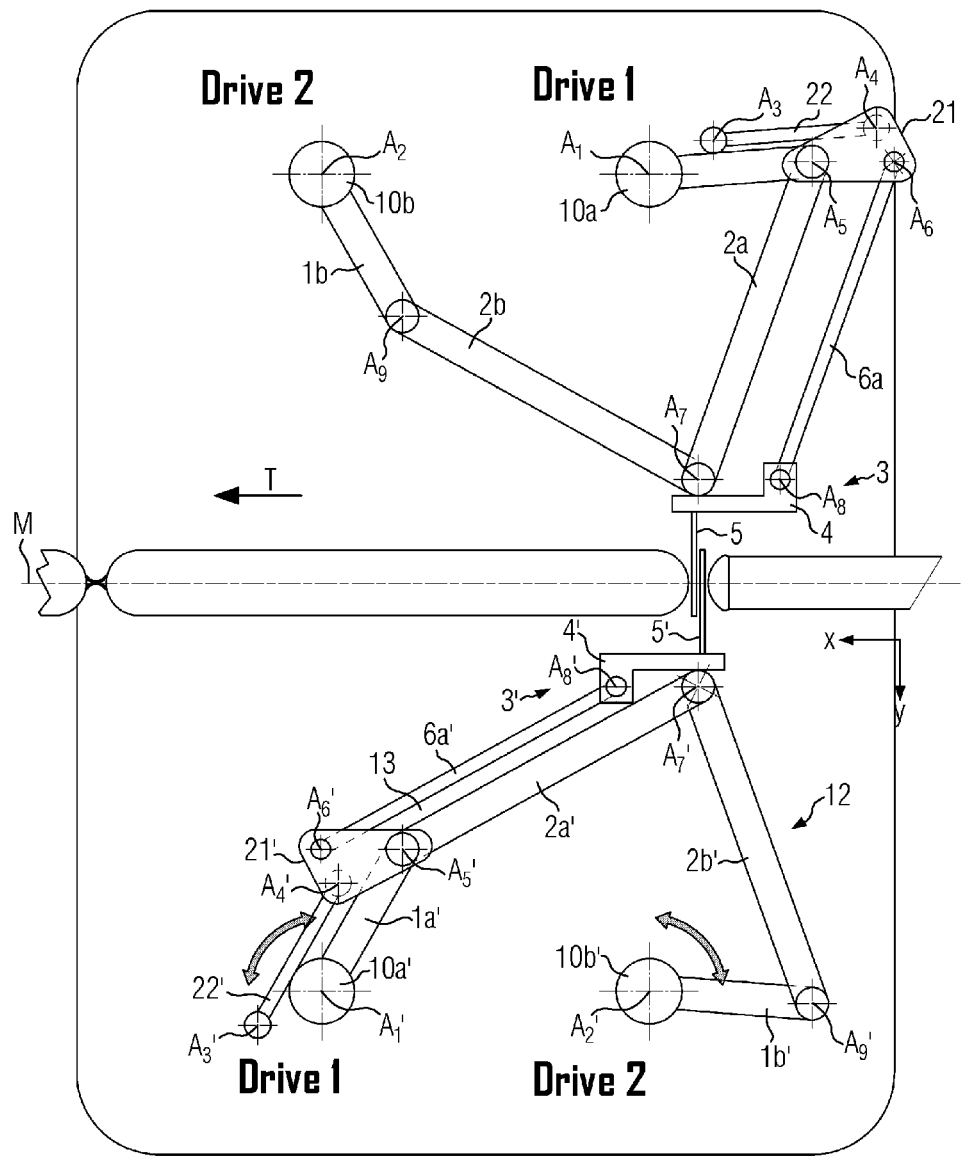
FIG. 5 shows, schematically, a top view of the device for portioning having a long conveyance path for delicate sausages, in a first position.
Figure 6:
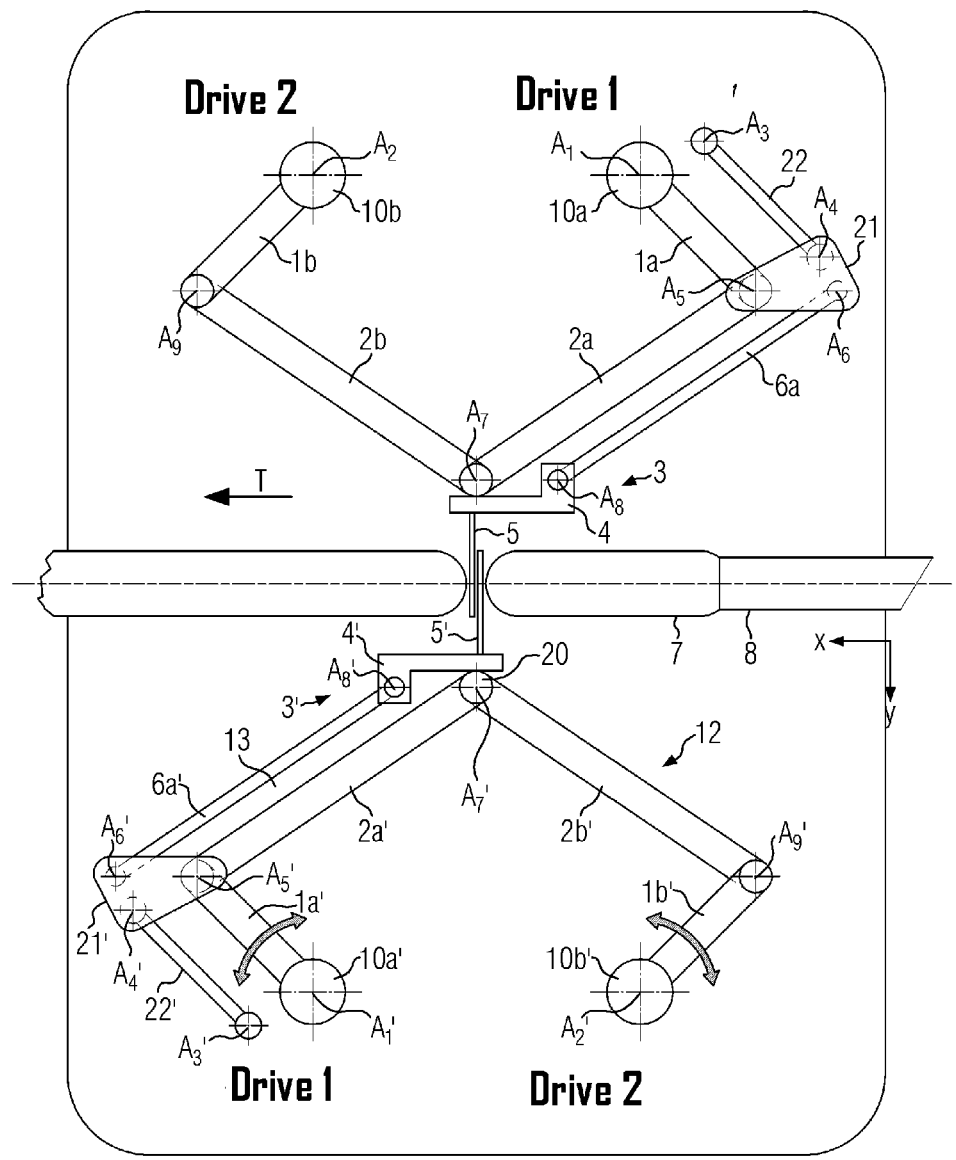
FIG. 6 shows the device shown in FIG. 5, in a second position.
Figure 7:
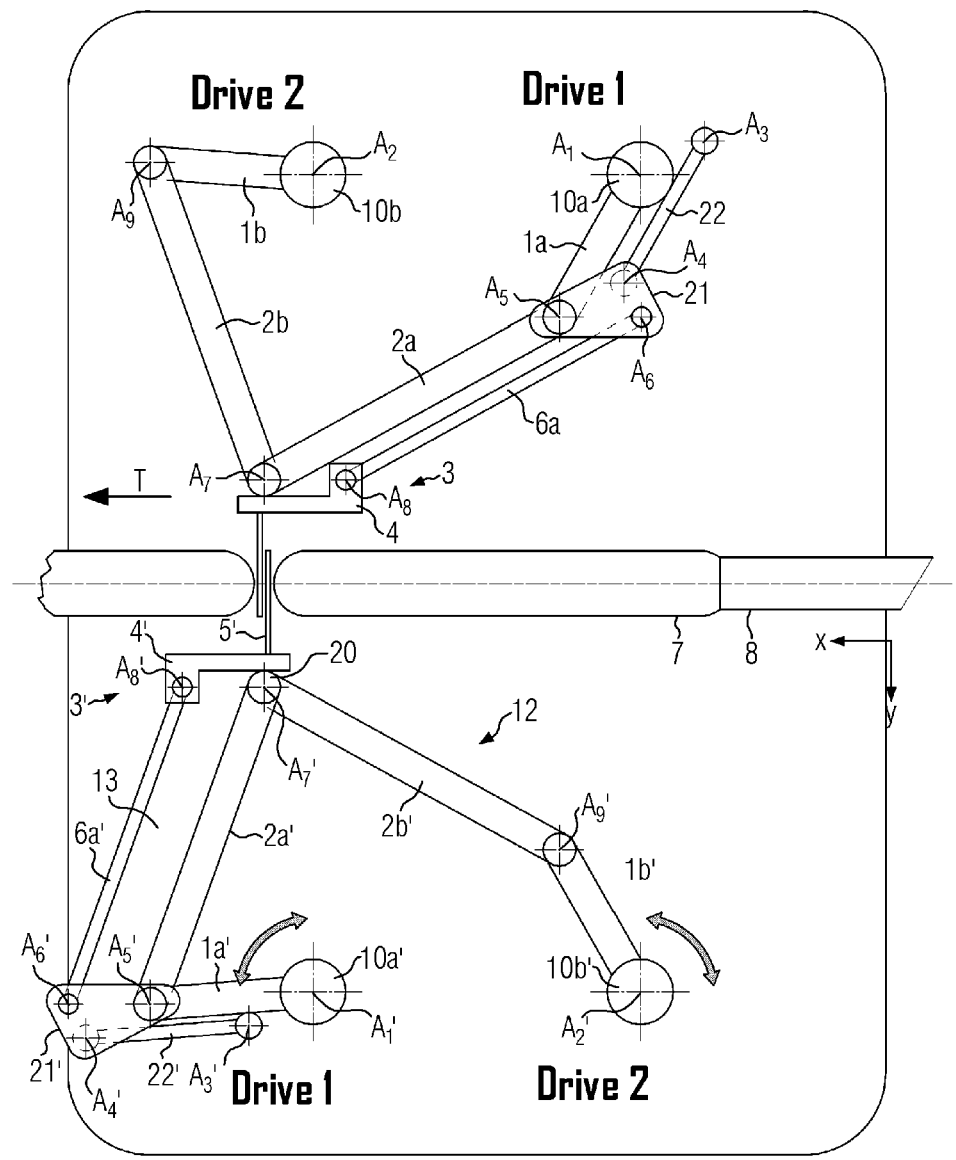
FIG. 7 shows the device shown in FIGS. 5 and 6, in a third position.
Figure 8:
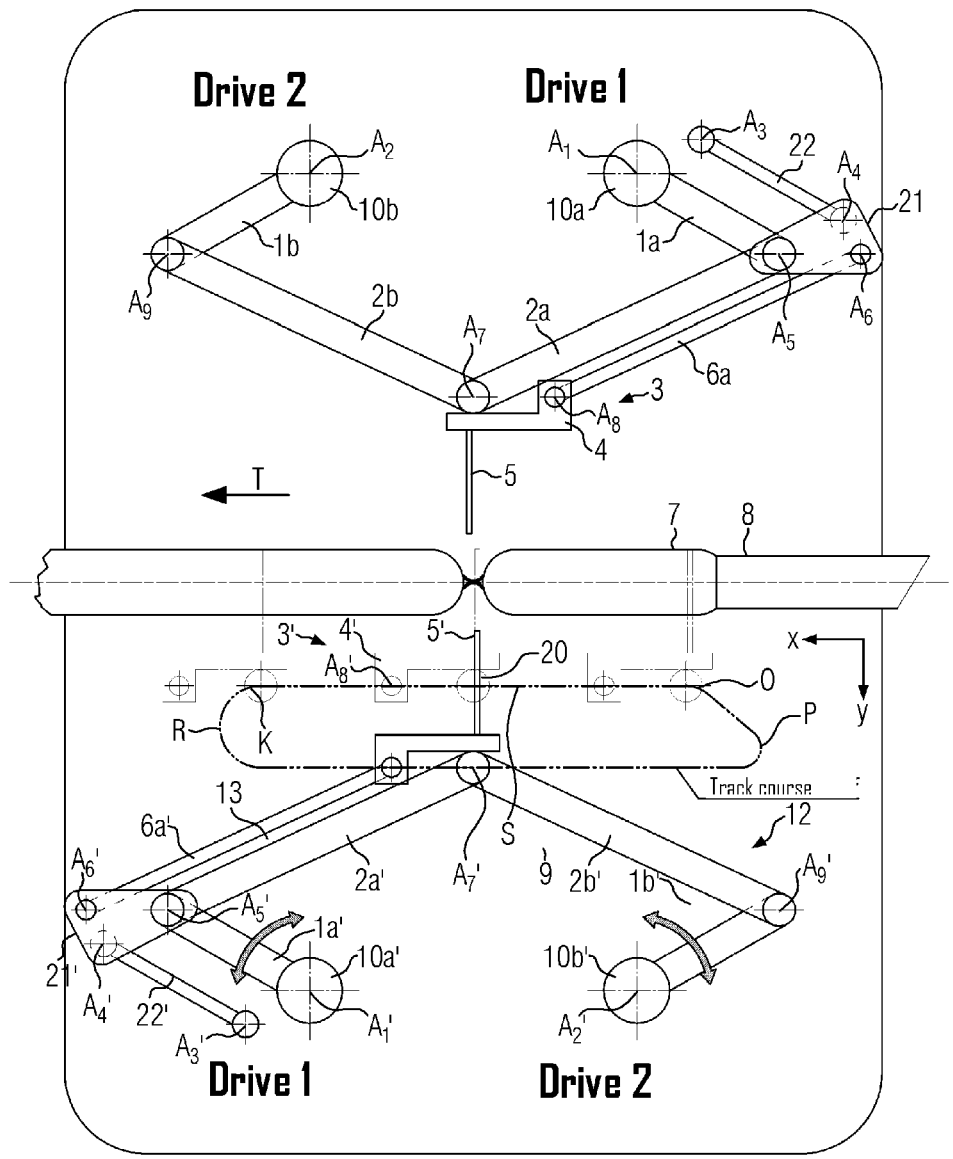
FIG. 8 shows the device shown in FIGS. 5-7, in a fourth position.

In conjunction with FIGS. 2-4, the movement on a track 9 having a short co-transport distance, shall be explained, wherein short sausage portions, in particular, can be produced here, as well as longer portions in more robust sausage casings. In FIGS. 5-8, the same device is shown, which is now, however, operated such that longer sausage portions can be produced, which require a longer conveyance distance. This means that the freely programmable track 9, as can be seen in particular in FIG. 8, differs from the track course shown in FIGS. 2-4. In particular, the distance here, in which portioning elements are moved in the direction of transport (from point P to point R) and in particular the distance s as well, in which the displacement elements, or the portioning elements 3, 3', respectively, are moved parallel to the central axis M in the direction of transport T, are longer than in the previous embodiment example, in order that the long sausage portion is supported and guided for as long as possible. FIG. 5 shows the mutually engaging displacement elements 5, 5', which engage in the sausage string. In FIG. 6, the displacement elements move with the sausage string, for support, in the direction of transport T to the end of the distance s at point P. At this point, the displacement elements, as is indicated in FIG. 7, begin to pull away from the sausage string again, wherein the portioning elements 3, 3' are then returned again to point P on the track. The track and speed of the portioning elements 3, 3' are likewise aligned, as is the case in the first embodiment example, such that the portioning elements, or displacement elements 5, 5', respectively, again engage in the sausage string at a determined portion length L. In FIG. 8, different positions of the portioning elements are shown by dotted lines.

Figure 9:
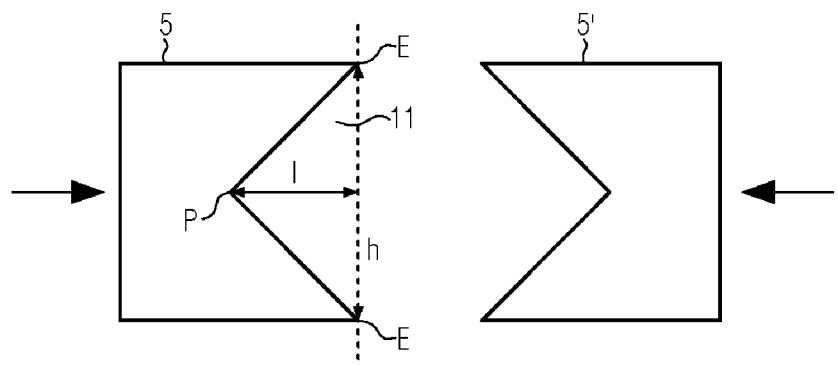
FIG. 9 shows a rough, schematic side view of two displacement elements lying opposite one another, according to the present invention.

FIG. 9 shows, roughly schematically, displacement elements 5, 5', which can be moved toward one another, as indicated by the arrow. Because the extent of the movement of the displacement element 5 at a right angle to the direction of transport T can be freely adjusted, it is possible to use displacement elements of only one size for all calibers. The displacement elements have a recess 11, which runs, by way of example, from the front ends E of the displacement element 5 to a point P. The recess can, for example be triangular, arched, etc. The spacing I from a point P, as far back as possible, to a straight line between the corner points E lies in a range of ≤100 mm, preferably 5-100 mm, or 5-40 mm, respectively. The spacing h between the outermost corner points E of the displacement element lies in a range of 10-100 mm, preferably 10-50 mm.

If small sausage calibers are portioned, the displacement elements must be moved further toward one another, until they engage with the sausage string, than with sausages having a larger caliber. Because the movement track 9 can be freely adjusted, no interchangeable parts, i.e. different displacement elements, are needed here.

A potential method shall be explained below, based on the FIGS. 1-9.

As described above, prior to production, certain parameters, in addition to other parameters that are not, however, decisive for this patent application, are entered in the input means 19. In particular, the length of the sausage portion, the caliber of the sausage portion, and the type of sausage casing, can be entered. Furthermore, the transport speed for the transported sausage string in the direction of transport T can also be entered, or the speed is determined from other values by the control unit for the filling machine, and used for the activation of the device.

Depending on these parameters, the control unit 15 computes a specific track or calls up a previously stored track by means of a program, for example.

Based on these parameters, the portioning element is thus moved along an appropriate track at appropriate speeds. The ideal shape of the track, together with the speeds, is determined experimentally, and/or computed. By way of example, the distance s or the spacing from point P to point R, i.e. the distance where the respective portioning element exhibits a movement component in the direction of transport, is determined in relation to the length of the sausage portion. The extent of the movement at a right angle to the direction of transport T is, for example, dependent on the caliber. The speed at which the displacement elements 5 are inserted in the sausage string depends on the type of sausage casing. With delicate sausage casings, a slow, gentle constriction is carried out. The entire track can thus be adjusted in relation to the product or the casing. With delicate natural intestine casings, it is also advantageous if the distance in which the sausages are conveyed—are thus in contact with the portioning elements, is longer that that in comparison with more robust sausage casings. The conveyance speed, i.e. the speed in the direction of transport T, for the portioning elements, when they are in contact with the sausage casing, or engaged in the sausage string 7, can correspond to the speed of the sausage string 7 in the direction of transport T. This will keep the product from being damaged. It is, however, also possible to move the portioning element more slowly than the sausage string, wherein the filled sausage string can then be backed up, or more quickly, in order to stretch out the portioning location. Optionally, the displacement elements 5 can be retracted only far enough from the sausage string that, e.g. other guidance tasks can be assumed. These guidance tasks can also be designed such that, e.g., with longer portions, the displacement elements are closed only to the sausage caliber, or slightly larger than the sausage caliber, and thus, when travelling with the sausage portions, the sausage portions are only conveyed centrally. Different residual cross-sections (insertion depths) can be adjusted to by means of the flexible movement of the portioning elements at a right angle to the sausage.

When the displacement elements 5, 5' are inserted in the sausage string 7 to a sufficient depth, as is shown, for example, in FIG. 2, the twist-off drive can be actuated via the motor at this position, or in a position along the distance s, wherein the sausage string 7 is twisted about it central axis M, and then a portioning location arises at the displacement elements 5. Until the displacement elements retract from the sausage string, the sausage string is still conveyed by the displacement elements, after which the sausage portions are then transferred to another conveyor 14 for further transport.

With the present invention, a portioning location can be generated wherein the constriction procedure (movement between points P and O) and the conveyance movement in the direction of transport (between points P and R) as well as the decoupling procedure (e.g. between points K and R) can be controlled independently of one another, such that the process can be optimally adjusted to a specific product.

Figure 10:
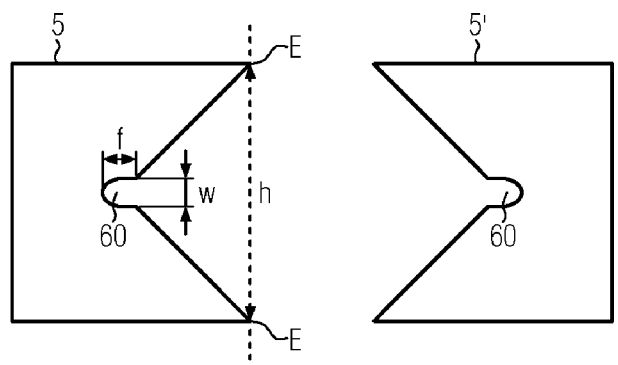
FIG. 10 shows a rough, schematic side view of two displacement elements lying opposite one another, according to another embodiment.

The two portioning elements 3, 3' can be also be driven independently of one another. This opens up the possibility of moving them at different speeds in the direction of transport T after the engagement of the displacement elements 5, 5', and to bring the displacement elements 5, 5' to a spacing by means of this relative movement, thus forming a "pigtail." In this manner, the device shown can also be used for clipping machines, wherein the clip is placed on the pigtail between the displacement elements. Advantageously, the displacement elements are then used, which, e.g., exhibit another U-shaped recess in the middle of the prism, in order that the casing is prevented from slipping out, as is shown in FIG. 10.

This means that the displacement elements, as is shown in FIG. 9, have a recess 11, the height h of which, from the front ends E, decrease to a value w, wherein w lies in a range from 2-8 mm, and the recess 60 adjoins the recess 11 at this point. The length f preferably lies in a range of 1-10 mm. This recess can also, e.g., have a C-shaped or V-shaped section, such that the casing can be retained by means of the recess 60.

The invention claimed is:

1. A method for portioning a sausage string generated by a filling machine into single sausage portions, having the following steps:
   transporting the sausage string in a direction of transport (T);
   portioning the sausage string with opposing portioning elements that engage in the sausage string;
   wherein a movement of each of the portioning elements is controlled along a freely adjustable track, and wherein a speed of the respective portioning elements in a direction perpendicular to the direction of transport (X) for the sausage string, when the respective portioning element moves from an outer surface of the sausage string into the sausage string, differs from a speed counter to this direction, perpendicular to the direction of transport for the sausage string, when the respective portioning element is retracted from the sausage string.

2. The method according to claim 1, wherein track coordinates (X, Y) of the track as well as the speed of the respective portioning elements are adjusted at different track sections in relation to at least one of the following parameters:
   length of the sausage portion;
   caliber of the sausage portion;
   transport speed of the transported sausage portion in the direction of transport (T); and
   type of sausage casing.

3. The method according to claim 1, wherein the movement of the respective portioning element in a direction perpendicular to the direction of transport (Y) is controlled independently of the movement in a direction in the direction of transport (X), and the speed of the respective portioning elements in a direction perpendicular to the direction of transport is controlled independently of the speed of the portioning elements in the direction of transport (T).

4. The method according to claim 1, wherein the portioning elements are each moved on their track for a predetermined distance (s) on a track section, while they are touching the sausage string or engaged in the sausage string, which runs parallel to a central axis (M) of the sausage string, and the predetermined distance (s) lies in a range of 0-100 mm.

5. The method according to claim 1, wherein the same portioning elements are used for different sausage calibers.

6. A method for portioning a sausage string generated by a filling machine into single sausage portions, having the following steps:
   transporting the sausage string in a direction of transport (T);
   portioning the sausage string with opposing portioning elements that engage in the sausage string;
   wherein a movement of each of the portioning elements is controlled along a freely adjustable track; and wherein the portioning elements pass through the following steps on their track:
   a constriction step, in which the portioning elements are moved toward one another from a starting point (P);
   a conveyance step, in which the portioning elements are each moved respectively in the direction of transport (T);
   a decoupling step, in which the portioning elements are each retracted from the sausage string; and
   a return step, in which the portioning elements are returned to the starting point (P);
   wherein the length of the conveyance step can be adjusted.

7. The method according to claim 6, wherein the portioning elements move at different speeds in the direction of transport (T) during the conveyance step.

8. A device for portioning a sausage string, having:
   two portioning elements which lie on opposite sides of the sausage string conveyed in a direction of transport (T);
   a freely adjustable track on which the portioning elements are moved; and
   two drives for each portioning element, which can be activated independently of one another, each having a movement mechanism, which is connected to the two drives and the respective portioning element, such that the respective portioning elements can be moved along the freely adjustable track; and
   wherein the respective movement mechanism comprises two drive links, each of which is connected to one of the two drives, and two coupling links, which are connected in an articulated manner to the drive links, wherein the coupling links are also connected in an articulated manner to one another, and the corresponding portioning element is disposed on at least one coupling link.

9. A device for portioning a sausage string, having:
   two portioning elements which lie on opposite sides of the sausage string conveyed in a direction of transport (T);
   a freely adjustable track on which the portioning elements are moved; and
   two drives for each portioning element, which can be activated independently of one another, each having a movement mechanism, which is connected to the two drives and the respective portioning element, such that the respective portioning elements can be moved along the freely adjustable track; and
   wherein the movement mechanism comprises a parallelogram guide, such that the respective portioning element maintains a consistent orientation to the sausage string during the movement on the track, and the portioning element attached to the coupling link maintains a consistent orientation to the sausage string during the movement along the track of the coupling link.

10. A device for portioning a sausage string, having:
    two portioning elements which lie on opposite sides of the sausage string conveyed in a direction of transport (T);
    a freely adjustable track on which the portioning elements are moved; and
    two drives for each portioning element wherein the drives execute a back and forth rotational movement during the movement of the portioning elements on their track.

11. The device according to claim 10, further comprising a control unit in which track coordinates (X, Y) are converted to angular positions of the drives.

12. The device according to claim 10, wherein the opposing portioning elements each have two drives, wherein at least one drive of the portioning elements is coupled to a respective drive of the other portioning element.

13. A filling machine having a device according to claim 10, wherein the filling machine has an input means, in which the following parameters can be entered:
    length and caliber of a sausage portion.

14. The filling machine of claim 13, wherein a sausage casing type can be entered via the input means.

15. A device for portioning a sausage string, having:
    two portioning elements which lie on opposite sides of the sausage string conveyed in a direction of transport (T);
    a freely adjustable track on which the portioning elements are moved; and
    wherein the portioning elements can be driven independently of one another, and advantageously, the device further having displacement elements which have a recess, a height (h) of which decreases in a longitudinal section from a central axis, to a value (w), wherein a second recess adjoins the recess, which is designed such that after an engagement of the displacement elements in the sausage string, a sausage pigtail can be retained in the recess.

\* \* \* \* \*